US008010655B2

(12) United States Patent
Dey et al.

(10) Patent No.: US 8,010,655 B2
(45) Date of Patent: Aug. 30, 2011

(54) NETWORK MONITORING SYSTEM AND METHOD

(75) Inventors: Sujit Dey, San Diego, CA (US); Nishant Mittal, Egg Harbour Township, NJ (US); Debashis Panigrahi, San Diego, CA (US)

(73) Assignee: The Regents of the University of California, Oakland, CA (US)

(*) Notice: Subject to any disclaimer, the term of this patent is extended or adjusted under 35 U.S.C. 154(b) by 101 days.

(21) Appl. No.: 11/667,404

(22) PCT Filed: Nov. 17, 2005

(86) PCT No.: PCT/US2005/041801
§ 371 (c)(1),
(2), (4) Date: Oct. 25, 2007

(87) PCT Pub. No.: WO2006/055768
PCT Pub. Date: May 26, 2006

(65) Prior Publication Data
US 2008/0104231 A1    May 1, 2008

Related U.S. Application Data

(60) Provisional application No. 60/628,729, filed on Nov. 17, 2004, provisional application No. 60/628,733, filed on Nov. 17, 2004.

(51) Int. Cl.
*G06F 15/16* (2006.01)
(52) U.S. Cl. ...................................................... 709/224
(58) Field of Classification Search .................. 709/224; 370/395.21
See application file for complete search history.

(56) References Cited

U.S. PATENT DOCUMENTS

| 6,021,426 | A  | 2/2000 | Douglis et al. |
| 6,341,145 | B1 | 1/2002 | Hioe et al. |
| 6,404,923 | B1 | 6/2002 | Chaddha |

(Continued)

FOREIGN PATENT DOCUMENTS

EP        1414253        4/2004

(Continued)

OTHER PUBLICATIONS

Chandra Krintz and Rich Wolski, "Using JavaNws to Compare C and Java TCP-Socket Performance", *Concurrecy and Computation: Practice and Experience*, vol. 13, 2001, pp. 815-839.

(Continued)

*Primary Examiner* — Kevin Bates
*Assistant Examiner* — Angela Nguyen
(74) *Attorney, Agent, or Firm* — Greer, Burns & Crain Ltd.

(57) ABSTRACT

A method for monitoring a wireless channel or wireless network. Preferably, the method and system monitors a web-based network. Active data probing is used to estimate bandwidth availability when no a-priori knowledge of the current channel or network condition is available, and passive monitoring is used to track ongoing web traffic in estimating the current bandwidth available. Data probes are selected that are dynamically customized based on application requirements and the network variability observed in view of a balancing between accuracy of the bandwidth estimation and the potential overhead in terms of time consumed and additional traffic used. In this way, under specified limits of overhead, the active probing attempts to achieve best-effort network bandwidth estimation, and the passive monitoring tracks ongoing web traffic in estimating the current bandwidth available.

15 Claims, 5 Drawing Sheets

U.S. PATENT DOCUMENTS

| | | | |
|---|---|---|---|
| 6,532,220 | B1 | 3/2003 | Carneal et al. |
| 6,587,457 | B1 | 7/2003 | Mikkonen |
| 6,601,009 | B2* | 7/2003 | Florschuetz ............ 702/124 |
| 6,728,270 | B1 | 4/2004 | Meggers et al. |
| 6,742,047 | B1 | 5/2004 | Tso |
| 6,892,226 | B1 | 5/2005 | Tso |
| 6,992,983 | B1 | 1/2006 | Chatterjee |
| 2002/0091794 | A1 | 7/2002 | Moran et al. |
| 2002/0091840 | A1* | 7/2002 | Pulier et al. .............. 709/228 |
| 2002/0116491 | A1* | 8/2002 | Boyd et al. ............... 709/224 |
| 2003/0026343 | A1 | 2/2003 | Kim et al. |
| 2003/0110272 | A1 | 6/2003 | du Castel et al. |
| 2003/0145079 | A1* | 7/2003 | Breese et al. ............. 709/224 |
| 2003/0195960 | A1* | 10/2003 | Merriam .................. 709/224 |
| 2003/0217162 | A1* | 11/2003 | Fu et al. ................... 709/229 |
| 2003/0229822 | A1 | 12/2003 | Kim et al. |
| 2003/0233445 | A1 | 12/2003 | Levy et al. |
| 2004/0039836 | A1 | 2/2004 | Wee et al. |
| 2004/0049574 | A1 | 3/2004 | Watson et al. |
| 2004/0068560 | A1* | 4/2004 | Oulu et al. ............... 709/224 |
| 2004/0085989 | A1 | 5/2004 | Boumendil et al. |
| 2005/0216572 | A1 | 9/2005 | Tso et al. |
| 2005/0226196 | A1 | 10/2005 | Suh |

FOREIGN PATENT DOCUMENTS

| | | |
|---|---|---|
| KR | 020020013983 | 2/2002 |
| WO | WO 00/67469 | 11/2000 |
| WO | WO02/056563 | 7/2002 |
| WO | WO 2005/050346 | 6/2005 |

OTHER PUBLICATIONS

U.S. Appl. No. 11/667,203, filed Jul. 12, 2007, Sujit Dey.

U.S. Appl. No. 11/661,584, filed Sep. 4, 2007, Sujit Dey.

Bytemobile Technology: Macara™ Dynamic Optimization Technology, http://www.bytemobile.com/products/macara.html, 2 pages, May 7, 2007.

Venturi Wireless Solutions Technology, http://www.venturiwireless.com/solutions/technology.html, 3 pages, May 7, 2007.

Albanese, A., Blomer, J., Edmonds, J., Luby, M., and Sudan, M., "Priority Encoding Transmission," presented at IEEE Symposium on Foundations of Computer Science, pp. 604-612, 1994.

Demircin, M. U. and Altunbasak, Y., "Finite-Horizon FEC-Rate Adaptation for Real-Time Wireless Multimedia," in Proceedings of Wireless Communications and Networking Conference, pp. 1770-1775, Georgia 2004.

Konrad, A., Zhao, B.Y., Joseph, A.D., Ludwig, R., "A Markov-Based Channel Model Algorithm for Wireless Networks," In Proc. of Fourth ACM International Workshop on Modeling, Analysis and Simulation of Wireless and Mobile Systems, pp. 1-9, 2001.

Mohr, A. E., Riskin, E. A., and Ladner, R. E., "Unequal Loss Protection: Graceful Degradation of Image Quality over Packet Erasure Channels through Forward Error Correction," IEEE Journal on Selected Areas in Communication, vol. 18, No. 6, pp. 819-828, Jun. 2000.

Panigrahi, D., Dey, S., "Chaser: Content and Channel Aware Object Scheduling and Error Control for Wireless Web access in 3G Networks," IEEE, pp. 2119-2123, 2004.

Ramos, Naomi, et. al., "A Device and Network-Aware Scaling Framework for Efficient Delivery of Scalable Video Over Wireless Networks," *The 18th Annual IEEE International Symposium on Personal, Indoor and Mobile Radio Communications (PIMRC'07)*, IEEE 2007.

Rogers, J. K. And Cosman, P. C., "Robust Wavelet Zerotree Image Compression with Fixed-Length Packetization," in Proceedings of Data Compression Conference, pp. 1-10, 1998.

Skodras, A., Christopoulos, C., and Ebrahimi, T., "The JPEG 2000 Still Image Compression Standard," in IEEE Signal Processing Magazine, September, pp. 36-58, 2001.

Song, R., Liu, H., Wen, J., Ma, W., "Learning Block Importance Models for Web Pages," The Thirteenth World Wide Web Conference (WWW 2004), New York, pp. 203-211, May 2004.

Soong, A., Oh, S., Damnjanovic, A., and Yoon, Y., "Forward High-Speed Wireless Packet Data Service in IS-2000—1xEV-DV," IEEE Communications Magazine, vol. 41, pp. 170-177, Aug. 2003.

"ViewSonic CRT Display Products—Professional Series," ViewSonic Corporation: CRT Display Products, www.viewsonic.com/popup/product/view.

* cited by examiner

NETWORK MONITORING SYSTEM AND METHOD

PRIORITY CLAIM

This application claims priority of U.S. Provisional Patent Application Ser. No. 60/628,729, filed Nov. 17, 2004, and U.S. Provisional Patent Application Ser. No. 60/628,733, filed Nov. 17, 2004.

TECHNICAL FIELD

A field of the invention is data communications. A specific exemplary application of the invention is to wireless data communications.

BACKGROUND ART

Internet access is currently being offered in a wide variety of public and private settings through wireless connections. Users are becoming more dependent on such widespread access. However, data communications such as web usage, file transfer, multimedia applications, and other popular applications place high demand on wireless data connections. Often, these experiences are unlike the broadband experience provided in workplace and home environments, as extensive, unpredictable latency is a common characteristic of a wireless connection.

One of the ways to provide a predictable user experience for data communication is to adapt the content that is delivered to the user based on current network conditions. Techniques have been proposed to monitor network conditions for wired networks, but these techniques typically have very high overhead and provide inaccurate estimates for typical wireless networks.

DISCLOSURE OF THE INVENTION

Preferred embodiments of the present invention provide, among other things, a method for monitoring a wireless channel or wireless network. In a preferred method, active data probing is used to estimate bandwidth availability when no a-priori knowledge of the current channel or network condition is available, and passive monitoring is used to track ongoing web traffic in estimating the current bandwidth available. Data probes are selected that are dynamically customized based on application requirements and the network variability observed in view of a balancing between accuracy of the bandwidth estimation and the potential overhead in terms of time consumed and additional traffic used. In this way, under specified limits of overhead, the active probing attempts to achieve best-effort network bandwidth estimation, and the passive monitoring tracks ongoing web traffic in estimating the current bandwidth available.

BEST MODE OF CARRYING OUT THE INVENTION

It is advantageous to monitor a network connection, such as a wireless connection, so that the determined network condition can be used to provide improved transmission of data. Such transmission, for example, may be between a content provider and a user via the internet. As one example, network monitoring may be used to improve wireless web service by customizing web content in accordance with a determined network condition. A significant challenge in enabling fast and predictable wireless web applications is the dynamic variability in wireless channel conditions such as available bandwidth, delay and jitter. The dynamic variability in wireless channels, such as wireless networks, is caused by the inherent nature of the wireless channels, mobility and distance from a base station, and the number of wireless subscribers present.

To compensate for such dynamic variability, a dynamic adaptation technique may be used to adjust the content delivery according to the current channel/network conditions. However, in such adaptive applications, estimation/measurement of the current network condition must be made accurately to allow optimal adaptation.

Preferred embodiments of the present invention provide a method for estimating the current channel or network conditions experienced by a client device. In exemplary embodiments, the channel and network are wireless. However, it is contemplated that the channel and network may be partially or fully wired. Embodiments of the invention provide a low-cost network monitor (e.g., a wireless network monitor) to measure properties of the network, and based on the measured values, estimate application-layer network bandwidth availability. The resulting data, for example, may be used by data communication improvement techniques. However, it is contemplated that the network monitoring system and method may be used in any application or application which needs an estimate of application-layer network bandwidth. Preferably, the method is implemented without the need to install any new software on a client device.

Generally, a preferred embodiment network monitoring method uses data probes to guide available application-layer bandwidth monitoring. A data probe includes a group (chunk) of data that is sent or received along with a measuring mechanism to measure network behavior during transmission of the chunk of data. For example, in a web-based application, a data probe may include commented HTML data with web scripting (e.g., JavaScript) functions to measure the duration of transmission. In a preferred embodiment, these web scripting functions include a time stamp for determining when the data probe is first received by a client, and when it is fully received by the client.

An exemplary measurement method is divided into two types or phases: active data probing, and passive monitoring. The active data probing phase is used to estimate the bandwidth availability when no a-priori knowledge of current network condition is available. An active data probe includes a customized chunk of information and a measuring mechanism. The selection of data probes for the active data probing phase preferably is dynamically customized based on the client application requirements as well as the network variability observed. Further, the selection of data probes preferably is made conscious of the tradeoffs involved between the accuracy of the bandwidth estimation and the potential overhead in terms of time consumed and additional traffic used. Under specified limits of overhead, typically provided at installation of the network monitor based on service requirements, the active data probing phase attempts to achieve best-effort network bandwidth estimation.

Additionally, in order to avoid the overhead of active probing, preferred embodiments of the invention also use a passive monitoring phase to track ongoing web traffic in estimating the current bandwidth available. Generally, in passive monitoring, a measurement mechanism is added to an existing chunk of data from a web page requested by the client (that is, the actual HTML content transferred) to provide the data probe, before the web page is transmitted to the client. For example, a web scripting language may be wrapped around the chunk of data to provide a data probe generating a time stamp for sending and receiving the requested chunk of data.

With the combined monitoring information from the active data probe and passive monitoring phases, the current bandwidth available at a particular time is estimated. This result then can be used, for example, by a data communication improvement application or other application. The active data probing phase may be used again when a wireless network condition has changed significantly or the information from the passive monitoring phase becomes stale.

Figure 1:
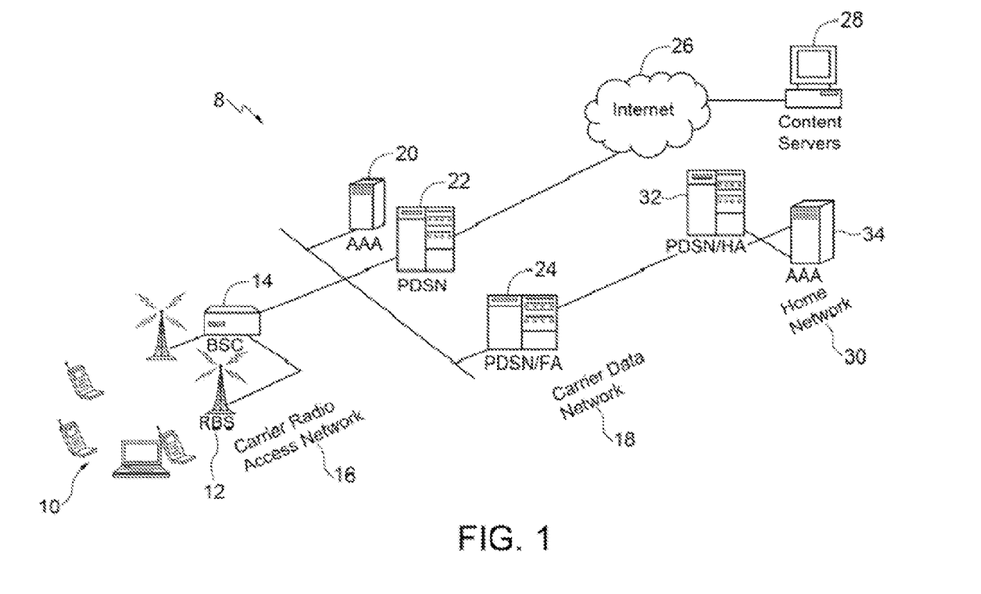
FIG. 1 shows an exemplary wireless network architecture for use with a network monitoring method, according to an embodiment of the present invention.

Referring now to the drawings, FIG. 1 shows a network architecture 8 that may be used with the network monitoring system and method of exemplary embodiments of the present invention. One or more users or clients 10 is associated with a Radio Base Station (RBS), and connected, for example via wireless radio protocols as known by those of ordinary skill in the art. A set of the RBSs 12 are controlled by a Base Station Controller (BSC) 14. The BSC 14 implements radio resource management functionalities including mobile handoffs between different. RBSs 12, power control, scheduling of data, etc.

The RBS 12 and BSC 14 form a carrier radio access network 16, which provides access for the wireless users 10. A carrier data network 18 is linked to the carrier radio access network 16, and may include an authentication, authorization, and accounting (AAA) system 20, a packet-data serving node (PDSN) 22, and a packet-data serving node foreign agent (PDSN/FA) 24.

For data communications, the Packet Data Serving Node (PDSN) 22 is a special node that acts as a gateway to the wired internet 26, and can substitute as a foreign agent for mobile-IP based implementation. Additionally, the PDSN 22 can act as a proxy server between the wired and wireless world, implementing many important tasks such as content adaptation and transcoding for wireless data, split-transport protocol, etc. Content servers 28 supply web data content to the internet 26. The PDSN/FA 24 may be linked to a home network 30, including a packet-data serving node home access (PSDN/HA) 32, itself linked with an AAA 34.

A network monitoring system 40, which may be implemented in server software by the PDSN 22 or the BSC 14, retrieves web pages from the content servers 28 via the PDSN 22. Alternatively, the network monitoring system 40 may reside on the content server 28 in, server software implemented on a web server, or anywhere in the network between the content server and the client, such as a proxy server.

Figure 2:
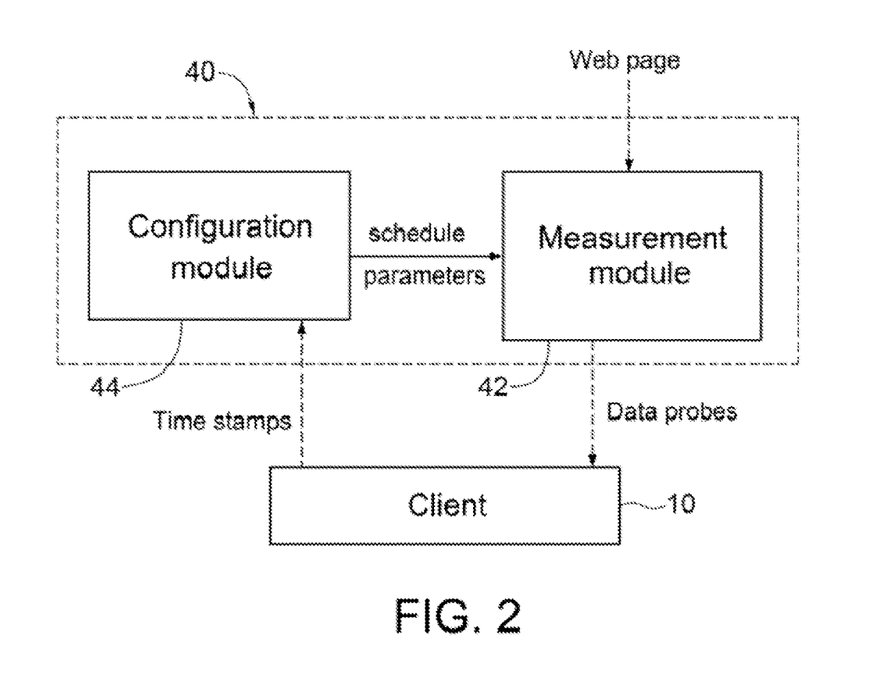
FIG. 2 shows a preferred system for network monitoring, according to embodiments of the present invention.

Referring now to FIG. 2, a network monitoring system 40 in a preferred embodiment includes a measurement module 42 and a configuration module 44. The measurement module 42 creates both active data probes and data probes for passive monitoring, and collects available bandwidth samples from the data probes. As stated above, the active data probes and the data probes for passive monitoring generated by the measurement module 42 may be implemented in a suitable web scripting language, such as JavaScript, to implement the measurement functionality across all different types of browsers.

The configuration module 44 decides the probing schedule, i.e., the choice of starting an active probing phase or using the passive information available, selects the probing parameters, such as probe size and number of probes for active probing, and finally estimates the available bandwidth using the active probe and passive information. A preferred configuration module 44 is implemented in Perl and JavaScript.

Figure 3:
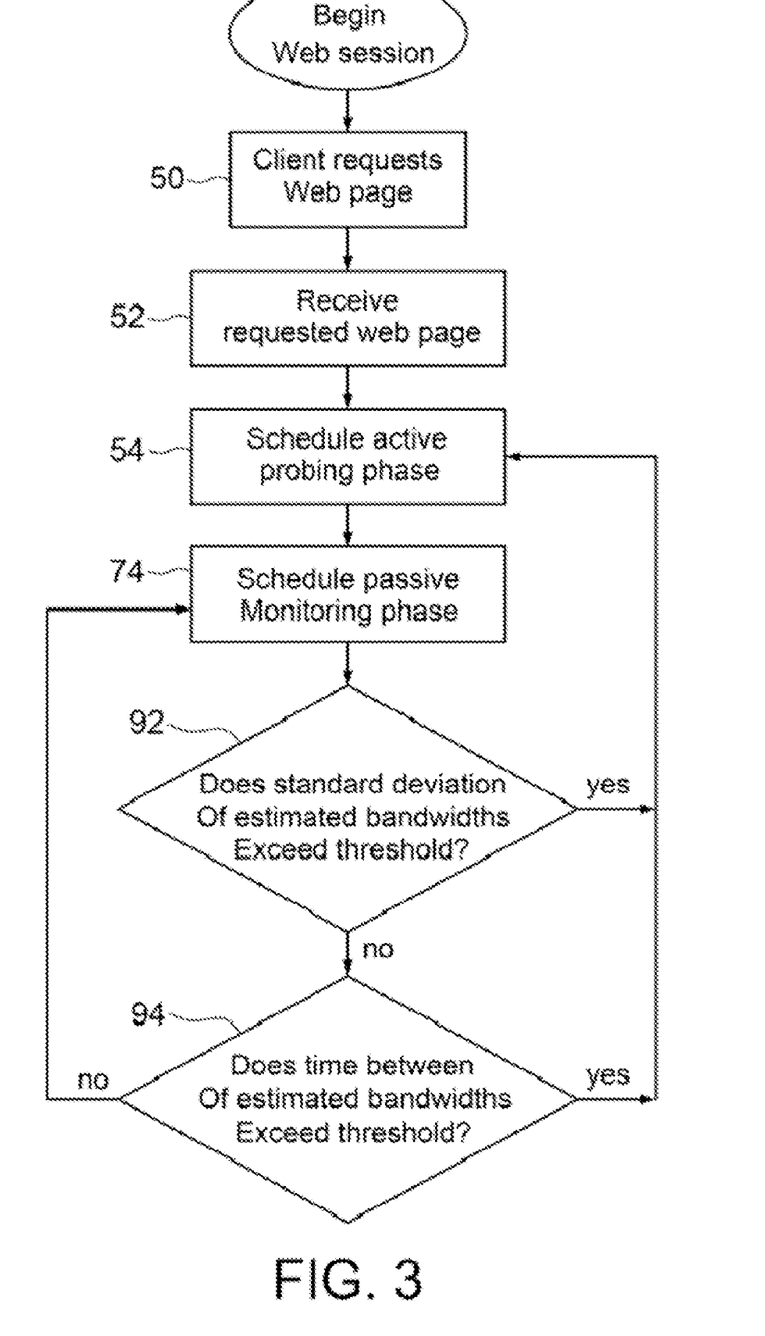
FIG. 3 shows steps in a preferred network monitoring method, according to embodiments of the present invention.

FIG. 3 shows an exemplary overall operation of the network monitoring system 40. When a new web page is requested by a user (step 50), a proxy server gets the requested web page from the content server (step 52). At this point, the network monitoring system 40 has no a priori knowledge of the current channel or network condition. Accordingly, the configuration module 44 schedules an active probing phase (step 54), and supplies parameters for generating the active probe.

Figure 4:
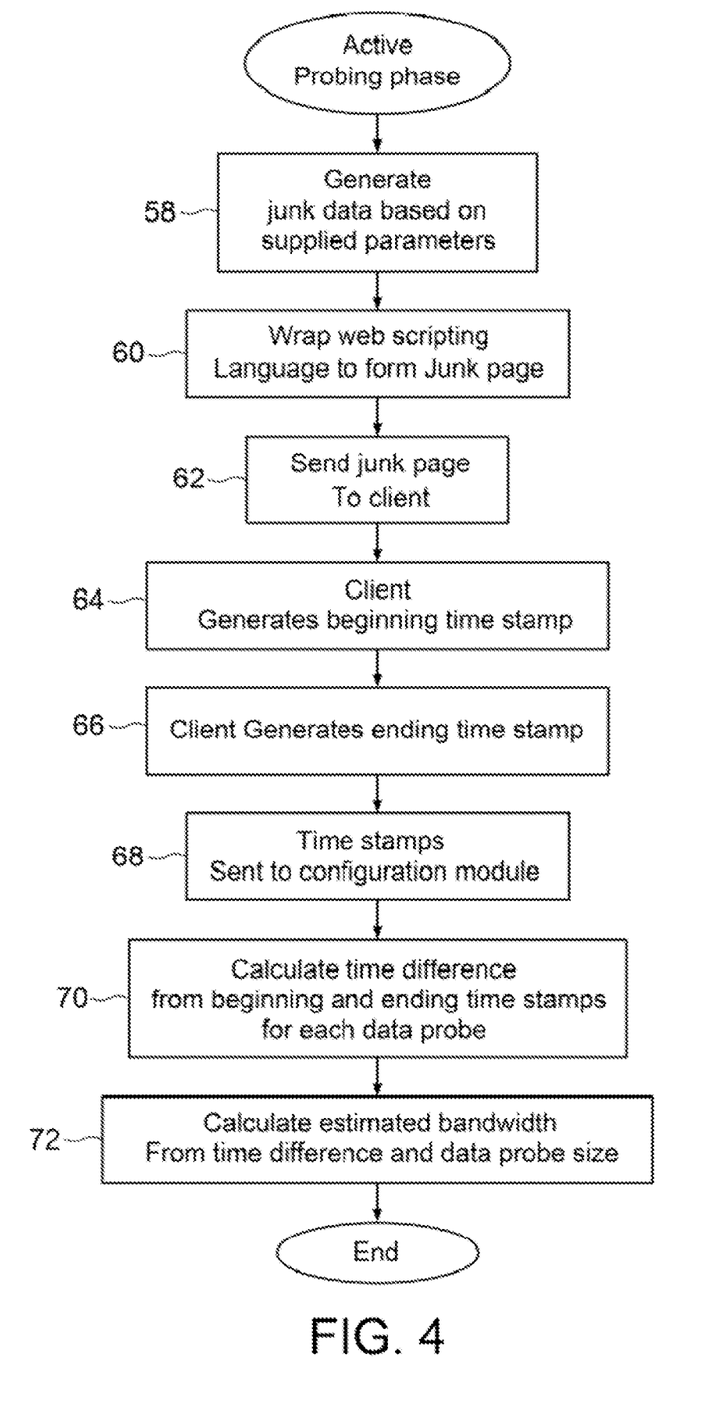
FIG. 4 shows steps in a preferred active data probing method, according to embodiments of the present invention.

An active data probing phase is described in an exemplary embodiment in FIG. 4. To provide one or more active data probes, additional HTML data, referred to herein as junk data, is generated (step 58) by the measurement module 42 according to parameters selected by the configuration module 44, preferably through a CGI script. The junk data is separate from the data forming the requested web page. The measurement mechanism (e.g., web scripting language such as JavaScript) is added to the junk data to form a new web page, referred to as a junk page (step 60). The parameters selected preferably are based on the client application requirements, for example, the delay of network monitoring, as well as the network variability already observed, such as variability in the bandwidth measurements previously collected. Preferably, the junk data is randomly generated (either in advance, such as by extracting from a larger junk data file, or generated in real time), and is that is not significantly compressible, so that it provides a controllable amount of data for more accurately estimating available bandwidth.

The size of each probe can be predetermined (e.g., controlled) by the configuration module 44, as opposed to the data probes during the passive monitoring phase, which are controlled by the content provider (by determining the size of individual objects in the page). If the probe size is too small, the resulting data provided by the measurement mechanism is closer to a delay than a true estimate of network bandwidth. Thus, the probe size should be sufficient to provide a more accurate estimate. However, if the probe size is too large, the additional delay presented to the client may be too large. Thus, a tradeoff is made according to the configuration module 44. For wireless networks, for example, the active data probe size preferably is about 1 kilobyte-5 kilobytes.

As another consideration, because the junk data is information additional to the information actually requested from the client, it is desirable to limit the delay-due to the use of the junk page. However, embedding data already requested by the user, which occurs in the passive monitoring phase, may result in data probes that are too small to provide sufficiently accurate bandwidth estimates. Thus, the parameters supplied by the configuration module 44 are in consideration of the tradeoffs involved between the accuracy of the bandwidth estimation and the potential overhead in terms of time consumed and additional traffic used. Under specified limits of overhead, typically provided at installation of the network monitor based on service requirements, the active data probing phase attempts to achieve best-effort network bandwidth estimation.

Preferably, multiple active data probes are sent to the client. For example, during the active probing phase, a first, predetermined size data probe may be sent to the client. If the time measured is less than a predefined threshold, the probe size is increased for a subsequent probing phase, provided the increased probe size does not exceed the delay constraint for the active probing phase. If the standard deviation of the time differences collected (in the current and previous time stamps received for same-sized probes) is higher than an upper fraction (e.g., 50%) of an average of the time differences collected, then the same size data probe is repeated for an additional run. If the standard deviation is below the upper fraction but above a lower fraction (e.g., 10%), then the same size probe is repeated, provided that the delay constraint is not violated. The active data probing phase is completed when the standard deviation of time differences received is below the lower fraction of the average.

In a preferred embodiment, the generated junk data is divided into a sequence of junk data groups, and each group is time stamped using web scripting language. For example, for junk data totaling 1000 bytes, a sequence of junk data groups may be from 1-250 bytes, 250-500 bytes, 500-750 bytes, and 750-1000 bytes. This provides multiple active data probes for more accurate bandwidth estimation.

The active data probe(s) is/are sent to the client (step 62). The measurement mechanism is configured to determine at the client side how long it takes for the active data probe to reach the client. As shown in FIG. 4, when the reception of the data probe by the client begins, a first time stamp is generated (step 64) by the measurement mechanism, and when the reception ends, a second time stamp is generated (step 66). If additional data probes are received by the client, beginning and ending time stamps for these probes are generated as well. If the data probes are for data groups in sequence, the time stamp indicating the end of a first probe may also be the time stamp for the beginning of the subsequent probe.

These time stamps are sent back to the configuration module (step 68) for estimating bandwidth, and are stored by the network monitor for future computation. For each active data probe, a total time difference between beginning and ending time stamps is calculated (step 70), and given this time difference as well as the size of the transmitted data in the probe, the average data per time is calculated (step 72), for example, which represents the estimated bandwidth for a period of time between the network monitor and the client. The calculated estimated bandwidths also are stored for future calculations.

Figure 5:
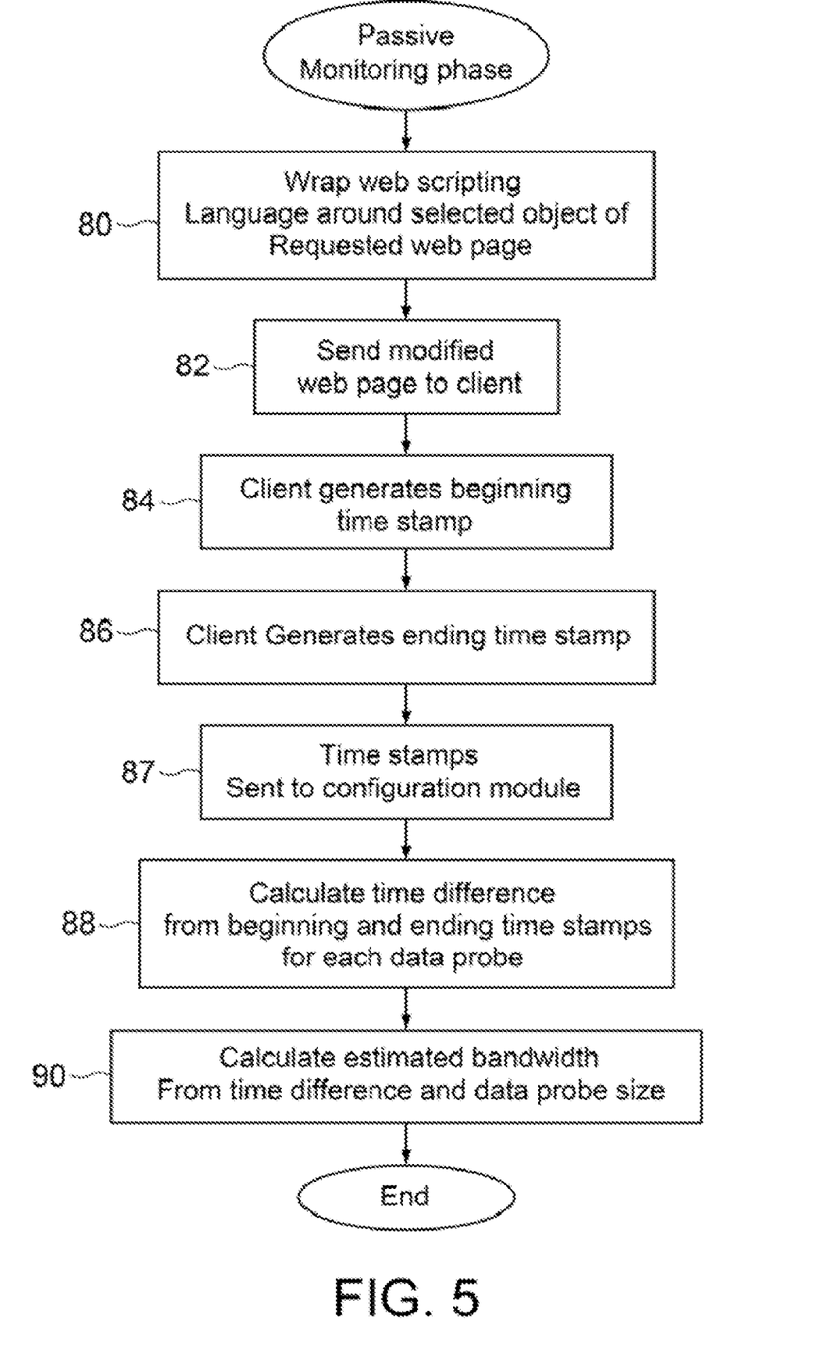
FIG. 5 shows steps in a preferred passive monitoring method, according to embodiments of the present invention.

After the active monitoring phase is completed, and referring again to FIG. 3, the configuration module 44 preferably then schedules the passive monitoring phase (step 74). The passive information is collected whenever new data is requested by the user, and an active probe is not selected by the configuration module 44. In the passive information stage, as shown in FIG. 5, individual objects (images, HTML text, etc.) of the web page requested by the client are downloaded, and a size for each of the objects is determined. The objects are wrapped (step 80) by the measurement module 42 with a web scripting language to generate the beginning and ending time stamps to create a modified web page, before the web page is sent to the client. Preferably, a number (as a nonlimiting example, 5) of objects having the largest size (a large image, for example) are selected for wrapping. In a preferred embodiment, the wrapping of web scripting language is performed using CGI script to embed the JavaScript in the HTML. This wrapped web scripting language provides the measurement mechanism for the passive monitoring phase.

The passive information collected during the passive monitoring phase depends on the structure of the content and measures observed bandwidth availability during the current session. Examples of passive information collected for a web session include the download time for the complete webpage as well as the individual images in the webpage.

As with the active probing phase, during the passive monitoring phase the embedded web page is sent to the client (step 82), in response to the client's request. For each of the wrapped objects, preferably including the HTML body text and one or more of the largest images (which may be subsequently downloaded by the client), a time stamp indicating when the wrapped object is first received (step 84) and when the object is completely received (step 86) are generated and sent to the configuration module 44 for estimating bandwidth. As with the active probing phase, the configuration module 44 stores the received time stamps, calculates the time difference between time stamps for each wrapped object (step 88), and calculates an estimated bandwidth based on the calculated time difference and the object size (step 90). The configuration module also stores the estimated bandwidth for future calculations.

Next, referring again to FIG. 3, the configuration model determines whether an active probing phase or a passive monitoring phase should be scheduled. After the initial active probing phase, decisions preferably are made between active probing and passive monitoring based on a statistical model that tracks the standard deviation of bandwidths received from an initial active probe and subsequent passive monitoring. In a preferred embodiment, if the standard deviation exceeds a threshold (step 92), such as a predetermined fraction of an average bandwidth collected over time (for both active data probing and passive monitoring), the configuration module 44 schedules a new active data probing phase (step 54) for when the client requests a new set of data. Each active probing or passive monitoring phase is initiated by a request from the client.

If the standard deviation does not exceed the threshold, the configuration module then checks to see if a certain predetermined amount of time has elapsed (step 94), so that the bandwidth estimates do not get stale. The predetermined amount of time used for the threshold, for example, may depend on particular network variability.

If the predetermined time has elapsed, the configuration module schedules the active probing phase (step 54). Otherwise, the configuration module schedules passive monitoring (step 74) in response to additional data requests from the client. Preferably, the network monitoring process continues between active data probing and passive monitoring, with additional web data requests from the client, until the web session ends.

Preferred embodiment methods do not require any additional software at the client side. In addition, embodiments can exploit the programmability currently available in all web browsers, and hence can support a diverse variety of clients without any modification. Network monitoring in accordance with the invention is configurable to provide optimal network condition estimation under specified monitoring overhead in terms of the time consumed or the overhead traffic. Advantageously, embodiments of the invention exploit the passive network-related information observed from the past communication to predict the network condition for the future, thereby reduces the monitoring overhead significantly.

The monitoring method of preferred embodiments of the present invention is particularly applicable to wireless data communications, e.g., web access in a wireless 3G communications network, or through other types of wireless or non-wireless network connection, e.g., a broadband DSL connection.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, as set forth in the appended claims.

Various features of the invention are set forth in the appended claims.

The invention claimed is:

1. A method for estimating bandwidth of a network for delivery of data to a client, the method comprising:
generating a data object having a predetermined size;
wrapping the data object with a web scripting language for generating a beginning and an ending time stamp, to provide a web page; sending the provided web page to the client over the network, whereby the web scripting language generates the beginning and the ending time stamp;
receiving the generated beginning and ending time stamp;
estimating bandwidth of the network based on the generated beginning and ending time stamp and the size of the data object;
wherein said generating the data object comprises generating random data;
further comprising:
receiving a web page requested by the client;
generating one or more passive monitoring data probes comprises wrapping a web scripting language around one or more selected data objects in the received web page, the web scripting language generating a beginning and an ending time stamp when received by the client browser;
sending the generated one or more passive monitoring probes to the client; and
receiving the beginning and ending time stamp generated by the sent one or more passive monitoring data probes.

2. The method of claim 1, wherein the web scripting language comprises JavaScript.

3. The method of claim 1, wherein the random data is not significantly compressible.

4. The method of claim 1, wherein said generating comprises generating a plurality of data objects, each having a predetermined size, and wherein the web scripting language generates a beginning and an ending time stamp for each of the plurality of data objects.

5. The method of claim 1, wherein the network is wireless.

6. The method of claim 1, further comprising:
selecting the predetermined size of the data object based on at least one of variability of the network and network overhead.

7. A method for estimating bandwidth for delivering a requested web page to a client over a network, the method comprising:
receiving the requested web page;
generating one or more passive monitoring data probes using one or more data objects in the received web page, each of the generated passive monitoring data probes generating a beginning and an ending time stamp when received by a client web browser;
creating one or more active data probes comprising a generated data object of a predetermined size wrapped with a scripting language, each of the active data probes generating a beginning and an ending time stamp when received by the client web browser;
selecting either the generated passive monitoring data probes or the created active data probes for sending to the client;
sending the selected probes to the client over the network, whereby the selected probes generate the beginning and the ending time stamp;
receiving the generated beginning and ending time stamp;
estimating bandwidth of the network based on the generated beginning and ending time stamp and the size of the data object in the selected probes;
wherein said generating one or more passive monitoring data probes comprises wrapping a web scripting language around one or more selected data objects in the received web page, the scripting language generating a beginning and an ending time stamp received by the client browser.

8. The method of claim 7, wherein said selecting comprises selecting the generated active data probes when no a-priori knowledge of a current network condition is available.

9. The method of claim 7, wherein said selecting comprises selecting the generated active data probes if a standard deviation of previous estimated bandwidths exceeds a predetermined threshold.

10. The method of claim 7, wherein said selecting comprises selecting the generated active data probes if a predetermined time has elapsed after a previous generated active probe was sent to the client.

11. A network monitoring system for estimating bandwidth for delivering a requested web page to a client over a network, the system comprising:
means for receiving the requested web page;
means for generating one or more passive monitoring data probes comprising one or more data objects in the received web page wrapped with a web scripting language for generating a beginning and an ending time stamp when received by a client web browser;
means for creating one or more active data probes comprising a generated data object of a predetermined size wrapped with a scripting language for generating a beginning and an ending time stamp when received by the client web browser;
means for selecting either the generated passive monitoring data probes or the created active data probes for sending to the client;
means for sending the selected probes to the client over the network, whereby the selected probes generate the beginning and the ending time stamp;
means for receiving the generated beginning and ending time stamp; and
means for estimating bandwidth of the network based on the generated beginning and ending time stamp and the size of the data object in the selected probes.

12. The system of claim 11, wherein the system resides on a server.

13. The method of claim 7, wherein the network is wireless.

14. A method for monitoring a wireless network, the method comprising steps of:
passive monitoring to track ongoing web traffic in estimating bandwidth availability; and
active data probing to estimate bandwidth availability when no a-priori knowledge of a current channel or network condition is available;
wherein said active data probing comprises selecting data probes that are dynamically customized based on network variability observed in view of a balancing between accuracy of the bandwidth estimation and the potential overhead in terms of time consumed and additional traffic used, and sending the selected data probes to a client over the network;

wherein under specified limits of overhead, the active probing attempts to achieve best-effort network bandwidth estimation;

wherein said passive monitoring comprises:

receiving a web page requested by the client;

modifying the received web page by wrapping a web scripting language around one or more selected objects in the received web page for generating, for each selected object, a beginning and ending time stamp;

sending the modified web page to the client;

receiving the beginning and ending time stamp from the client for at least one object; and estimating the network bandwidth based on the received beginning, the ending time stamp, and the size of the at least one object;

wherein said active data probing comprises:

generating one or more data objects having a predetermined size;

wrapping a web scripting language around the one or more data objects for generating, for each object, a beginning and ending time stamp, to create a new web page;

sending the new web page to the client;

receiving the beginning and ending time stamp from the client for at least one object; and estimating the network bandwidth based on the received beginning, the ending time stamp, and the size of the at least one object.

15. The method of claim 14, wherein said active probing is conducted again when a wireless condition has changed significantly or the passive monitoring information becomes stale.

* * * * *

UNITED STATES PATENT AND TRADEMARK OFFICE
CERTIFICATE OF CORRECTION

| | | |
|---|---|---|
| PATENT NO. | : 8,010,655 B2 | Page 1 of 1 |
| APPLICATION NO. | : 11/667404 | |
| DATED | : August 30, 2011 | |
| INVENTOR(S) | : Sujit Dey et al. | |

It is certified that error appears in the above-identified patent and that said Letters Patent is hereby corrected as shown below:

In the Specification:
Col. 3, line 34          After "different" delete the ".".
Col. 4, line 37          Before "that is not" delete "is" and insert --if-- therefor.
Col. 6, line 61          Delete "reduces" and insert --reducing-- therefor.

In the Claims:
Col. 8, line 15, Claim 7, line 29          After "stamp" insert --when--.

In the Drawings:
FIG. 3, box 94, line 2          Delete "Of".

Signed and Sealed this

Thirteenth Day of December, 2011

David J. Kappos
*Director of the United States Patent and Trademark Office*